: 3,055,933
PROCESS OF PREPARING BENZOPHENONES
David Taub, Metuchen, N.J., assignor to Merck & Co., Inc., Rahway, N.J., a corporation of New Jersey
No Drawing. Filed Oct. 19, 1961, Ser. No. 146,322
10 Claims. (Cl. 260—496)

This invention is concerned generally with the preparation of complex organic compounds. More particularly, it is concerned with a new method of synthesizing benzophenone compounds. Still more specifically, it relates to a new process for obtaining 2,4'-dihydroxy-4,6,2'-trimethoxybenzophenone compounds of the formula

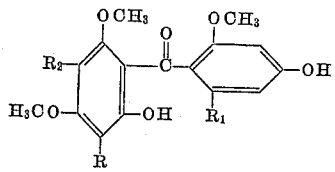

wherein R and $R_2$ are hydrogen or halo and $R_1$ is hydrogen or lower alkyl. More specifically yet, it is concerned with a process for producing an ester of such benzophenone from readily available starting materials and with the conversion of such ester to the compound depicted above.

The substituted benzophenones having the above structural formula are key intermediates in a chemical synthesis of griseofulvin and related compounds. According to the present invention, it has now been found that such benzophenones may be prepared by a process which comprises intimately contacting a 3,5-dimethoxyphenol and a 2-methoxy-4-acyloxy benzoic acid in the presence of trifluoroacetic anhydride. The acyloxy group in the 4-position of the benzoic acid compound is not affected during the reaction so that a benzophenone ester of Formula III below is obtained as the initial reaction product. This ester is converted to the corresponding alcohol by treatment with base. The process is represented structurally in the following flow diagram:

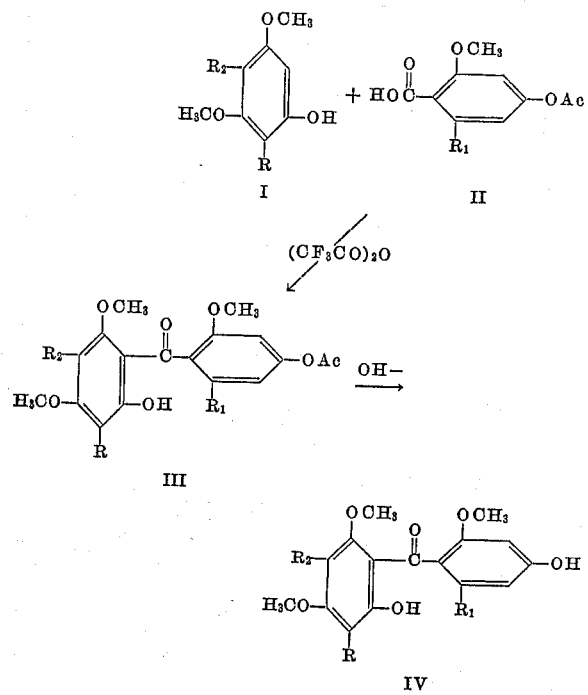

In the above formulas R and $R_2$ represent hydrogen or halogen. Although any of the four halogens may be present in the positions occupied by R and $R_2$, the preferred halo compounds are those wherein R and/or $R_2$ are chlorine or fluorine. $R_1$ represents hydrogen or a lower alkyl radical such as methyl, ethyl, propyl or isopropyl. Ac is a lower alkanoyl or benzoyl group, suitable alkanoyl substituents including acetyl, propionoyl, butyroyl and the like.

Production of the desired benzophenone ester III is brought about by intimately contacting the 2-R-3,5-dimethoxy-4-$R_2$-phenol (I) and a 2-methoxy-4-acyloxy-6-$R_1$-benzoic acid (II) (where R, $R_1$ and $R_2$ are as defined previously) in the presence of trifluoroacetic anhydride. Surprisingly, it has been discovered that when these two reactants are brought together in the presence of trifluoroacetic anhydride, Compound III is the primary reaction product. There is thus made available a direct synthesis of the benzophenone III in contrast to previously known processes which are longer and less convenient in that they involve condensation of a phenol and a benzoic acid halide to form a phenyl benzoate which must then be rearranged to the benzophenone.

The trifluoroacetic anhydride reaction of this invention is conducted by bringing the phenol and benzoic acid reactants together in the presence of a molar excess of the anhydride. It is convenient to employ trifluoroacetic anhydride as the reaction solvent, which of course provides a large molar excess of it, although organic solvents that are themselves inert to the anhydride may be used, if desired, to dilute the reaction mixture. Examples of suitable organic solvents that might be mentioned are hydrocarbons and ethers such as benzene, toluene, xylene, petroleum ether, dioxane and tetrahydrofuran.

The reaction is carried out at temperatures of less than about 40° C., i.e. less than the boiling point of trifluoroacetic anhydride. It is convenient to employ temperatures of about 20–30° C. and in a preferred embodiment the phenol of Formula I and the benzoic acid of Formula II are mixed with the trifluoroacetic anhydride in the cold (0–10° C.) and the reaction mixture allowed to warm to room temperature. For optimum yields of the desired benzophenone of Formula III reaction periods of at least about 10 hours are employed and highly satisfactory results are achieved with reaction times of about 15–25 hours. It will be appreciated by those skilled in the art that the 2-R-3,5-dimethoxy-4-$R_2$-phenol and the 2-methoxy-4-acyloxy-6-$R_1$-benzoic acid participate on an equimolar basis in formation of the benzophenone. Although equimolar amounts of the two compounds may be used, it is preferred to employ a slight molar excess of the benzoic acid derivative. Good results are obtained with a 5–15% molar excess of the benzoic acid although larger quantities could, of course, be used without adversely affecting the production of the benzophenone.

As stated previously, the acyloxy substituent present in the 4-position of the benzoic acid reactant is not affected in the trifluoroacetic anhydride reaction so that the immediate reaction product is the benzophenone III having an acyloxy substituent in the 4'-position. This ester function is readily saponified with dilute base, and it is convenient to treat the reaction mixture directly with base in order to obtain the benzophenone IV without isolation of the acylate. If desired, the acylate can be recovered from the reaction mixture in substantially pure form as long as it is not exposed to alkali for any substantial period of time.

Examples of benzophenone compounds which may be obtained by the process of this invention from the appropriate phenol and benzoic acid are 2-hydroxy-3-fluoro-4,6,2'-trimethoxy-4'-acetoxy-6'-methylbenzophenone from 2-fluoro-3,5-dimethoxyphenol and 2-methoxy-4-acetoxy-6-methyl benzoic acid; 2-hydroxy-3,5-difluoro-4,6,2'-trimethoxy-4'-acetoxy-6'-ethylbenzophenone from 2,4-difluoro-3,5-dimethoxyphenol and 2-methoxy-4-acetoxy-6-ethyl benzoic acid; 2-hydroxy-3-chloro-4,6,2'-trimethoxy-4'-benzoyloxy-6'-methylbenzophenone from 2-chloro-3,5-dimethoxyphenol and 2-methoxy-4-benzoyloxy-6-methyl benzoic acid; and 2-hydroxy-4,6,2'-trimethoxy-4'-propionoxy-6'-propylbenzophenone from 3,5-dimethoxyphenol and 2-methoxy-4-propionoxy-6-propyl benzoic acid. On treatment with a base such as an alkali metal hydroxide or alkali metal carbonate, these 4'-acylates are converted to the corresponding 4'-hydroxybenzophenones.

The benzophenone compounds of Formula IV hereinabove are converted to griseofulvin or analogs thereof by the following reaction sequence:

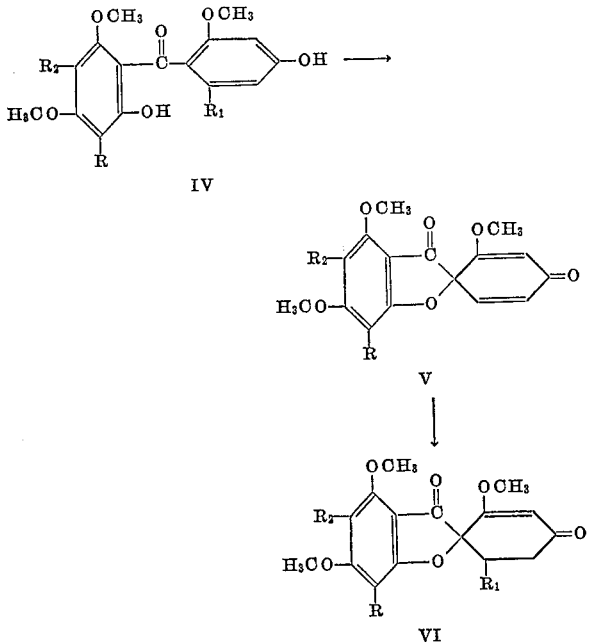

In this series of reactions R, $R_1$ and $R_2$ have the meanings previously described. In the first step of this process the benzophenone is treated with an alkali metal ferricyanide in aqueous potassium carbonate under nitrogen to product 7-R-5-$R_2$-4,6,2'-trimethoxy-6'-$R_1$-gris-2',5'-diene-3,4'-dione of Formula V. The nomenclature and numbering system used for describing these compounds, as well as those of Formula VI, is that recommended by Grove et al., J. Chem. Soc. 3977 (1952). The diene of structure V is converted to griseofulvin or the griseofulvin analog of structure VI by treatment with hydrogen in the presence of a palladium catalyst in a non-alcoholic solvent medium. The compound of structure VI, where R is chloro, $R_1$ is methyl and $R_2$ is hydrogen, is griseofulvin. This compound is a well-known antifungal agent effective on oral administration in the treatment of various systemic fungus infections. The griseofulvin analogs and related compounds wherein R, $R_1$ and $R_2$ have the meanings set forth above have antifungal activity, and are also useful as intermediates in making other griseofulvin-related compounds having such activity.

The benzoic acid compounds employed as one of the starting materials in the process of this invention have been described in the literature or are made from raw materials by well-known chemical processes. Certain of the phenols utilized as starting material are also known in the scientific literature. Those which have not been described may be prepared from phloroglucinoldimethyl ether or from 3,5-dimethoxy-4-chlorophenol by treatment of said substances with perchlorylfluoride and reaction of the resulting product with zinc. This process is described in more detail in the experimental section appearing hereinafter.

The following examples are given for the purpose of illustration and not by way of limitation:

EXAMPLE 1

2,4'-Dihydroxy-3-Fluoro-4,6,2'-Trimethoxy-6'-Methylbenzophenone 2.92 g. of 2-methoxy-6-methyl-4-acetoxy benzoic acid is added to 20 ml. of trifluoro acetic anhydride at 0° C. This solution is stirred and 2 g. of 2-fluoro-3,5-dimethoxy phenol is added. The resulting clear yellow solution is allowed to warm to 20–25° C. and maintained at that temperature for 20 hours. The trifluoro acetic anhydride is then removed in a stream of nitrogen and the residue dissolved in about 15 ml. of ether. The ether solution is washed with 5% aqueous sodium hydroxide and with water, dried over magnesium sulfate and concentrated to dryness in vacuo. The residue is crystallized from acetone-ether to give 2-hydroxy-3-fluoro-4,6,2'-trimethoxy-4'-acetoxy-6'-methylbenzophenone, M.P. 195–200° C.

In order to obtain the free benzophenone without isolation of the acetate, the process is carried out as described above through removal of trifluoro acetic anhydride with a nitrogen stream. The residue thus obtained is then dissolved in 20 ml. of methanol and 10 ml. of 5% aqueous sodium hydroxide solution added thereto with stirring. The mixture is maintained at 25° C. for 90 minutes and then acidified with dilute hydrochloric acid. It is then extracted with 3×10 ml. of chloroform. The chloroform extracts are combined, washed with water, dried over magnesium sulfate and then concentrated to dryness in vacuo. The residue thus obtained is crystallized from acetone-ether to give 2,4'-dihydroxy-3-fluoro-4,6,2'-trimethoxy-6'-methylbenzophenone, double M.P. 186–190° C.; 200–203° C.

When the process described immediately above is carried out employing 2-methoxy-6-ethyl-4-acetoxy benzoic acid in place of 2-methoxy-6-methyl-4-acetoxy benzoic acid, there is obtained 2,4'-dihydroxy-3-fluoro-4,6,2'-trimethoxy-6'-ethylbenzophenone.

EXAMPLE 2

2,4'-Dihydroxy-5-Chloro-4,6,2'-Trimethoxy-6'-Methylbenzophenone 2.2 g. of 4-chloro-3,5-dimethoxy phenol is added with stirring to a mixture of 2.92 g. of 2-methoxy-4-acetoxy-6-methyl benzoic acid in 20 ml. of trifluoro acetic anhydride. The addition of the phenol to the benzoic acid is carried out at 5° C. and the mixture then allowed to stand at room temperature for 25 hours. The solvent is then removed in a stream of nitrogen and the residue dissolved in 20 ml. of methanol. 10 ml. of 5% aqueous sodium hydroxide is added to the methanolic solution which is then held at room temperature for 80 minutes. It is acidified with dilute hydrochloric acid and extracted with 2×15 ml. of chloroform. The combined chloroform extracts are washed with water, dried over magnesium sulfate and evaporated to dryness in vacuo. The residue thus obtained is crystallized from a mixture of acetone and ether to give substantially pure 2,4-dihydroxy-5-chloro-4,6,2'-trimethoxy-6'-methylbenzophenone, M.P. 199–203° C.

EXAMPLE 3

2,4'-Dihydroxy-3-Chloro-4,6,2'-Trimethoxy 6'-Methylbenzophenone 1.5 g. of 2-methoxy-4-acetoxy-6-methyl benzoic acid is added to 12 ml. of trifluoro acetic anhydride, and 1.1 g. of 2-chloro-3,5-dimethoxy phenol then added to the trifluoro acetic anhydride solution with stirring at 0° C. The mixture is allowed to stand for 30 hours at room temperature. The solvent is then removed and the residue dissolved in methanol and treated with sodium hydroxide as described in Example 2. Extraction with chloroform and subsequent removal of the chloroform by concentration gives a residue consisting of 2,4'-dihydroxy-3-chloro-4,6,2'-trimethoxy-6'-methylbenzophenone which, on crystallization from ethyl ether gives substantially pure material, M.P. 212–215° C.

EXAMPLE 4

2-Hydroxy-3,5-Dichloro-4,6,2'-Trimethoxy-4'-Propionoxy-6'-Methylbenzophenone When the process of Example 1 is carried out utilizing 2,4-dichloro-3,5-dimethoxy phenol and 2-methoxy-4-propionoxy-6-methyl benzoic acid as starting materials and dissolving the residue, obtained after removal of trifluoroacetic anhydride, in ether, there is obtained from the ether extract 2 - hydroxy - 3,5 - dichloro - 4,6,2' - trimethoxy-4'-propionoxy-6'-methylbenzophenone. This latter substance may be converted to the corresponding 4'-hydroxy compound by treatment with dilute aqueous potassium hydroxide.

EXAMPLE 5

2,4'-Dihydroxy-4,6,2'-Trimethoxy-6'-Propylbenzophenone

Reaction of 2.5 g. of phloroglucinoldimethyl ether with 2 g. of 2-methoxy-4-acetoxy-6-propyl benzoic acid and 20 ml. of trifluoroacetic anhydride by the procedure of Example 1, and treatment of the reaction product with methanolic sodium hydroxide as described in Example 1, yields 2,4 - dihydroxy - 4,6,2' - trimethoxy - 6' - propylbenzophenone.

When 2 g. of 2-methoxy-4-acetoxy-6-methyl benzoic acid is employed as starting material in place of the 6-propyl benzoic acid, and the example carried out as described above, there is obtained 2,4'-dihydroxy-4,6,2'-trimethoxy-6'-methylbenzophenone, M.P. 180–182° C. When the reaction mixture obtained in this experiment is crystallized from ether as described in Example 1 (and not treated with methanolic sodium hydroxide), there is obtained 2-hydroxy-4,6,2'-trimethoxy-4'-acetoxy-6'-methylbenzophenone, M.P. 158–160° C.

EXAMPLE 6

The benzophenone compounds prepared by the new process described hereinabove are converted to griseofulvin or analogs thereof by the following procedures:

A. *Dehydrogriseofulvin.*—To a stirred solution of 2.25 g. of 2,4'-dihydroxy-4,6,2'-trimethoxy-6'-methyl-3-chloro-benzophenone and 27 g. of potassium carbonate in 250 ml. of boiled nitrogen-flushed distilled water is added a solution of 4.0 g. of potassium ferricyanide in 50 ml. of water. The addition is carried out in a nitrogen atmosphere over a period of 1 hour. The reaction mixture is stirred at room temperature under nitrogen for 18 hours. The precipitated material is recovered by filtration and air dried. It is dissolved in chloroform and the solution filtered. The chloroform is diluted with about an equal volume of ether and washed with ice-cold 2% potassium hydroxide solution and with water. The organic solvent solution is dried over magnesium sulfate, filtered and concentrated to dryness in vacuo. The residue is crystallized from acetone-ethyl acetate to afford substantially pure racemic dehydrogriseofulvin, M.P. 284–286° C.; λ max. 292 mμ (ε, 32,000), Infl. 230 mμ (ε, 22,000), Infl. 318 (ε 5,900). Further purification by passage through a Florisil column raises the melting point to 291–293° C.

*Griseofulvin.*—500 mg. of racemic dehydrogriseofulvin in 110 ml. of ethyl acetate is added to a stirred suspension of 1.0 g. of pre-reduced 10% palladium on charcoal catalyst and hydrogenated at atmospheric pressure and 22° C. When 1.0 mole of hydrogen is absorbed (occurs rapidly) the catalyst is removed by filtration and the filtrate concentrated in vacuo to a viscous pale yellow oil. This oil is dissolved in 50 ml. of methylene chloride and the solution washed with 3×10 ml. of ice-cold 2% potassium hydroxide, water, and dried over magnesium sulfate. The methylene chloride solution is filtered and concentrated to dryness in vacuo. The solid residue thus obtained is dissolved in 15 ml. of benzene and chromatographed on a column of 15 g. of Florisil. The column is eluated with 15-ml. portions of benzene, benzene-chloroform mixtures and finally with chloroform. From the chloroform eluates there are obtained two products, one with M.P. 213–215° C. and the second with M.P. 222–224° C. The higher melting material is racemic griseofulvin.

B. *7 - fluoro - 4,6,2' - trimethoxy - 6' - methyl - gris-2',5'-diene-3,4'-dione.*—To a solution of 700 mg. of 2,4'-dihydroxy - 3 - fluoro - 4,6,2' - trimethoxy - 6' - methyl-benzophenone in 20 ml. of tertiary butanol there is added a solution of 12.3 g. of potassium carbonate in 88 ml. of water. The butanol is removed from deep yellow solution by concentration in vacuo and 2.8 g. of potassium ferricyanide in 35 ml. of water is then added dropwise to the residual aqueous solution over a 5 minute period. A heavy cream colored precipitate forms. After stirring for 15 minutes at room temperature about 20 ml. of water is added and the resulting mixture extracted with 2×20 ml. of ethyl acetate. The organic extracts are combined, washed with cold dilute sodium hydroxide and sodium chloride solution, and dried over magnesium sulfate. The solution is then concentrated to dryness in vacuo and the residue thus obtained crystallizes from a mixture of acetone and ether to give substantially pure 7-fluoro-4,6,2'-trimethoxy-6'-methyl-gris-2',5'-diene-3,4'-dione, M.P. 222–225° C.

*7 - fluoro - 4,6,2' - trimethoxy - 6' - methyl - gris - 2'-ene-3,4'dione.*—A solution of 465 mg. of the product obtained immediately above in 50 ml. of 1,2-dimethoxy ethane is added to a stirred suspension of 900 mg. of 10% palladium on charcoal catalyst in 25 ml. of 1,2-dimethoxy ethane in a hydrogen atmosphere. The reaction is allowed to proceed until 0.9 equivalent of hydrogen is absorbed. This requires about 5 minutes. The hydrogenation is then stopped, the catalyst removed by filtration and the solvent removed by concentration in vacuo. The residue thus obtained is dissolved in 20 ml. of acetic acid and stirred with 800 mg. of zinc dust for 10 minutes. The zinc is then removed by filtration, 15 ml. of water added and the mixture extracted with 2×20 ml. of chloroform. The chloroform extracts are washed with dilute sodium hydroxide solution, with sodium chloride solution, and then dried over magnesium sulfate. The solvent solution is finally concentrated to dryness to give a colorless residue. This residue is dissolved in a small volume of chloroform and chromatographed on a column containing 26 g. of activated alumina. Elution of the column with benzene-chloroform yields 7 - fluoro - 4,6,2' - trimethoxy - 6' - methyl - gris-2'-ene-3,4'-dione which is purified from acetone-ether, M.P. 209–211° C.

C. *4,6,2' - trimethoxy - 6' - methyl - gris - 2' - ene-3,4' - dione.*—When 2,4' - dihydroxy - 4,6,2' - trimethoxy-6'-methylbenzophenone is treated with potassium ferricyanide in the presence of potassium carbonate by the procedure of Example 6B, there is produced 4,6,2'-trimethoxy-6'-methyl-gris-2,5'-diene-3,4'-dione, M.P. 241–244° C. Reaction of this material with hydrogen by the procedure of Example 6B produces 4,6,2'-trimethoxy-6'-methyl-gris-2'-ene-3,4'-dione, M.P. 218–19° C. A small amount of 4,6,2'-trimethoxy-6'-methyl-gris-3,4' dione, M.P. 169–71° C., is produced as a by-product.

D. *5 - chloro - 4,6,2' - trimethoxy - 6' - methyl - gris-2'-ene-3,4'-dione.*—Treatment of 2,4'-dihydroxy-5-chloro-4,6,2'-trimethoxy-6'-methylbenzophenone with potassium ferricyanide as described in Example 6B gives 5-chloro-4,6,2' - trimethoxy - 6' - methyl - gris - 2',5' - diene - 3,4'-dione, M.P. 204–207° C. Reduction of this diene by the method of Example 6B yields 5-chloro-4,6,2'-trimethoxy - 6' - methyl - gris - 2' - ene - 3,4' - dione, M.P. 213–14° C.

When 2,4' - dihydroxy - 4,6,2' - trimethoxy - 6' - propylbenzophenone is reacted with potassium ferricyanide, and the resulting product hydrogenated, by the procedures described above, there is produced 4,6,2'-trimethoxy - 6' - propyl - gris - 2',5' - diene - 3,4' - dione and 4,6,2' - trimethoxy - 6' - propyl - gris - 2' - ene - 3,4'- dione. Similar results are obtained when 2,4'-dihydroxy-3,5 - dichloro - 4,6,2' - trimethoxy - 6' - methylbenzophenone is treated with potassium ferricyanide in the presence of potassium carbonate, and the resulting product reduced with hydrogen in the presence of a palladium catalyst.

EXAMPLE 7

The fluorophenols of Formula I above (where at least one of R and $R_2$ is fluoro) may be obtained as described below.

A. *2-fluoro-3,5-dimethoxyphenol; 4-fluoro-3,5-dimethoxyphenol.*—A solution of 50 g. of phloroglucinol dimethyl ether in 400 ml. of pyridine is flushed with nitrogen by passing a stream of nitrogen through the solution for 5 minutes. The solution is then chilled to about 5° C. and perchloryl fluoride bubbled slowly through the solution. The mixture is allowed to warm to 25° C. and the slow addition of perchloryl fluoride (about one bubble per second) continued for 28 hours. The reaction mixture is then flushed with nitrogen and concentrated in vacuo to a syrup. 200 ml. of water is added to the syrup followed by sufficient cold 2.5 N hydrochloric acid to make the mixture acidic. The resulting yellow precipitate is recovered by filtration, washed with water and air dried. It consists essentially of a 1:1 mixture of $\Delta^{2,4}$-6,6-difluoro-3,5-dimethoxy-cyclohexadiene-1-one and $\Delta^{2,5}$-4,4-difluoro-3,5-dimethoxy cyclohexadiene - 1 - one, M.P. 80–115° C. These cyclohexadiene-ones are separated and obtained substantially pure by fractional crystallization from ether and finally from an acetone-ether mixture. The $\Delta^{2,5}$-cyclohexadieneone is less soluble than the $\Delta^{2,4}$-cyclohexadieneone. After purification by crystallization from ether and acetone-ether $\Delta^{2,4}$-6,6-difluoro-3,5-dimethoxy-cyclohexadiene-1-one has M.P. 105–107° C., and $\Delta^{2,5}$-4,4-difluoro-3,5-dimethoxy-cyclohexadiene-1-one has M.P. 146–48° C.

29 g. of the 1:1 mixture of cyclohexadieneones obtained as described in the preceding paragraph is added to 150 ml. of acetic acid. The solution is chilled to 10° C. and 30 g. of zinc dust added to it. The resulting mixture is stirred vigorously for 1 hour at 10–15° C. and then filtered. The solids are washed with 30 ml. of ether and 30 ml. of water, and the washings added to the filtrate. The filtrate is extracted with 3×100 ml. of ether. The ether extracts are combined, washed with cold dilute sodium hydroxide solution and dried over magnesium sulfate. The drying agent is then removed by filtration and the ether solution concentrated to dryness in vacuo to give 26 g. of a red oil. This oil is steam distilled and the distillate (about 15 liters) treated with sodium chloride and extracted with 3×5 liters of ether. The ether extracts are combined and concentrated to dryness to give about 12 g. of a pale yellow oil. This oil is crystallized from ether-petroleum ether to give substantially pure 2-fluoro-3,5-dimethoxyphenol, M.P. 68–70° C. The non-volatile residue from the steam distillation crystallizes slowly upon standing in the cold to give substantially pure 4-fluoro-3,5-dimethoxyphenol, M.P. 70–73° C.

B. *2-fluoro-3,5-dimethoxyphenol; 2-chloro-4-fluoro-3,5-dimethoxyphenol.*—60 g. of 2 - chloro - 3,5 - dimethoxyphenol in 500 ml. of pyridine is treated with perchloryl fluoride as described in Example 7A. The solid obtained upon completion of the reaction, removal of the pyridine, and acidification of an aqueous solution of the pyridine residue (the isolation procedure of Example 7A) consists of a mixture of $\Delta^{2,4}$-6-chloro-6-fluoro-3,5-dimethoxy-cyclohexadiene-1-one and $\Delta^{2,5}$-4,4-difluoro-6-chloro-3,5-dimethoxy-cyclohexadiene-1-one. These products are separated by fractional crystallization from ether and acetone-ether as described in Example 7A to give $\Delta^{2,4}$-6-chloro-6-fluoro-3,5-dimethoxy-cyclohexadiene-1-one, M.P. 100–102° C., and $\Delta^{2,5}$-4,4-difluoro-6-chloro-3,5-dimethoxy-cyclohexadiene-1-one, M.P. 197–99° C. The $\Delta^{2,4}$-6-chloro-6-fluorodieneone is the less soluble of the two products. Treatment of the pure cyclohexadieneones with zinc dust as described in the second paragraph of Example 7A and extraction of the reaction mixture with ether (as described above) affords an oil on removal of the ether in vacuo. This oil is triturated with ether to give crystalline 2-fluoro-3,5-dimethoxyphenol and 2-chloro-4-fluoro-3,5-dimethoxyphenol, respectively.

C. *2-fluoro-4-chloro-3,5-dimethoxyphenol; 4-fluoro-3,5-dimethoxyphenol.*—When 4 - chloro-3,5-dimethoxyphenol is treated with perchloryl fluoride as described in part B above, there is obtained a mixture of $\Delta^{2,4}$-4-chloro-6,6-difluoro-3,5-dimethoxy-cyclohexadiene-1-one and $\Delta^{2,5}$-4-chloro-4-fluoro-3,5 - dimethoxy - cyclohexadiene - 1 - one. Separation of this mixture by fractional crystallization and treatment of the separated products with zinc as described above yields 2-fluoro-4-chloro - 3,5 - dimethoxyphenol and 4-fluoro-3,5-dimethoxyphenol.

Any departure from the above description which conforms to the present invention is intended to be included within the scope of the claims.

What is claimed is:
1. The process for preparing a benzophenone of the formula

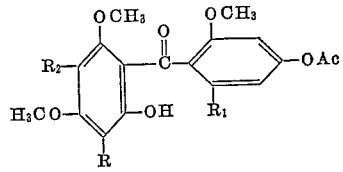

where R and $R_2$ are selected from the class consisting of hydrogen and halo, $R_1$ is selected from the class consisting of hydrogen and lower alkyl, and Ac is selected from the class consisting of lower alkanoyl and benzoyl that comprises intimately contacting in the presence of trifluoro acetic anhydride a phenol of the formula

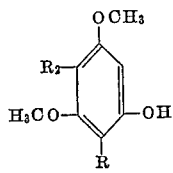

and a benzoic acid compound of the formula

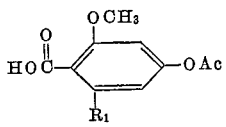

where R, $R_1$, $R_2$ and Ac are as defined above.

2. The process for preparing 2-hydroxy-3-halo-4,6,2'-trimethoxy-4'-loweralkanoyloxy - 6'-methylbenzophenone that comprises intimately contacting 2-halo-3,5-dimethoxy phenol and 2-methoxy-4-loweralkanoyloxy-6-methyl benzoic acid in the presence of trifluoro acetic anhydride.

3. The process for preparing 2-hydroxy-3,5-dihalo-4,6,2'-trimethoxy- 4'- loweralkanoyloxy - 6'- methylbenzophenone that comprises intimately contacting 2,4-dihalo-3,5-dimethoxy phenol and 2-methoxy-4-loweralkanoyloxy-6-methyl benzoic acid in the presence of trifluoro acetic anhydride.

4. The process of preparing 2-hydroxy-3-fluoro-4,6,2'-trimethoxy-4'-acetoxy-6'-methylbenzophenone that comprises intimately contacting 2-fluoro-3,5-dimethoxy phenol and 2-methoxy-4-acetoxy-6-methyl benzoic acid in the presence of trifluoro acetic anhydride.

5. The process for preparing 2-hydroxy-3-chloro-4,6,2'-trimethoxy-4'-acetoxy-6'-methylbenzophenone that comprises intimately contacting 2-chloro-3,5-dimethoxy phenol and 2-methoxy-4-acetoxy-6-methyl benzoic acid in the presence of trifluoro acetic anhydride.

6. The process for preparing a benzophenone of the formula

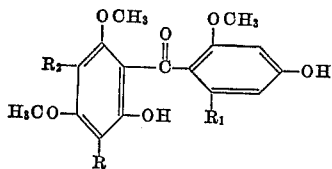

where R and $R_2$ are selected from the class consisting of hydrogen and halo, and $R_1$ is selected from the class consisting of hydrogen and lower alkyl that comprises intimately contacting in the presence of trifluoro acetic anhydride a phenol of the formula

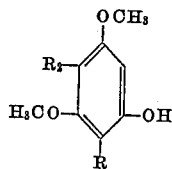

and a benzoic acid compound of the formula

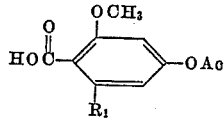

to produce a substance of the formula

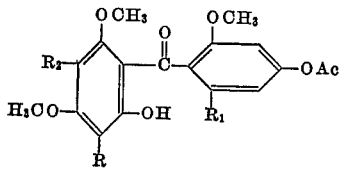

where R, $R_1$ and $R_2$ are as defined above and Ac represents a member of the class consisting of lower alkanoyl and benzoyl, and treating said latter substance with a base.

7. The process for preparing 2,4'-dihydroxy-3-halo-4,6,2'-trimethoxy-6'-loweralkylbenzophenone that comprises intimately contacting 2-halo-3,5-dimethoxy phenol and 2-methoxy-4-loweralkanoyloxy-6-loweralkyl benzoic acid in the presence of trifluoro acetic anhydride, and treating the resulting 2-hydroxy-3-halo-4,6,2'-trimethoxy-4'-loweralkanoyloxy-6'-loweralkyl benzophenone with a base.

8. The process for preparing 2,4'-dihydroxy-3-fluoro-4,6,2'-trimethoxy-6'-methylbenzophenone that comprises intimately contacting 2-fluoro-3,5-dimethoxy phenol and 2-methoxy-4-acetoxy-6-methyl benzoic acid in the presence of trifluoro acetic anhydride, and treating the resulting 2-hydroxy-3-fluoro-4, 6, 2'-trimethoxy-4'-acetoxy-6'-methylbenzophenone with alkali metal hydroxide.

9. The process for preparing 2,4'-dihydroxy-3-chloro-4,6,2'-trimethoxy-6'-methylbenzophenone that comprises intimately contacting 2-chloro-3,5-dimethoxy phenol and 2-methoxy-4-acetoxy-6-methyl benzoic acid in the presence of trifluoro acetic anhydride, and treating the resulting 2-hydroxy-3-chloro-4,6,2'-trimethoxy - 4'-acetoxy-6'-methylbenzophenone with alkali metal hydroxide.

10. The process for preparing 2,4'-dihydroxy-3,5-dihalo-4,6,2'-trimethoxy - 6'- loweralkylbenzophenone that comprises intimately contacting 2(4-dihalo-3,5-dimethoxy phenol and 2-methoxy-4-loweralkanoyloxy-6-loweralkyl benzoic acid in the presence of trifluoro acetic anhydride, and treating the resulting 2-hydroxy-3,5-dihalo-4,6,2'-trimethoxy-4'-loweralkanoyloxy-6'-loweralkylbenzophenone with a base.

No references cited.